E. J. BELKNAP.
TOOL HOLDING APPLIANCE.
APPLICATION FILED MAR. 17, 1908.
921,579.
Patented May 11, 1909.
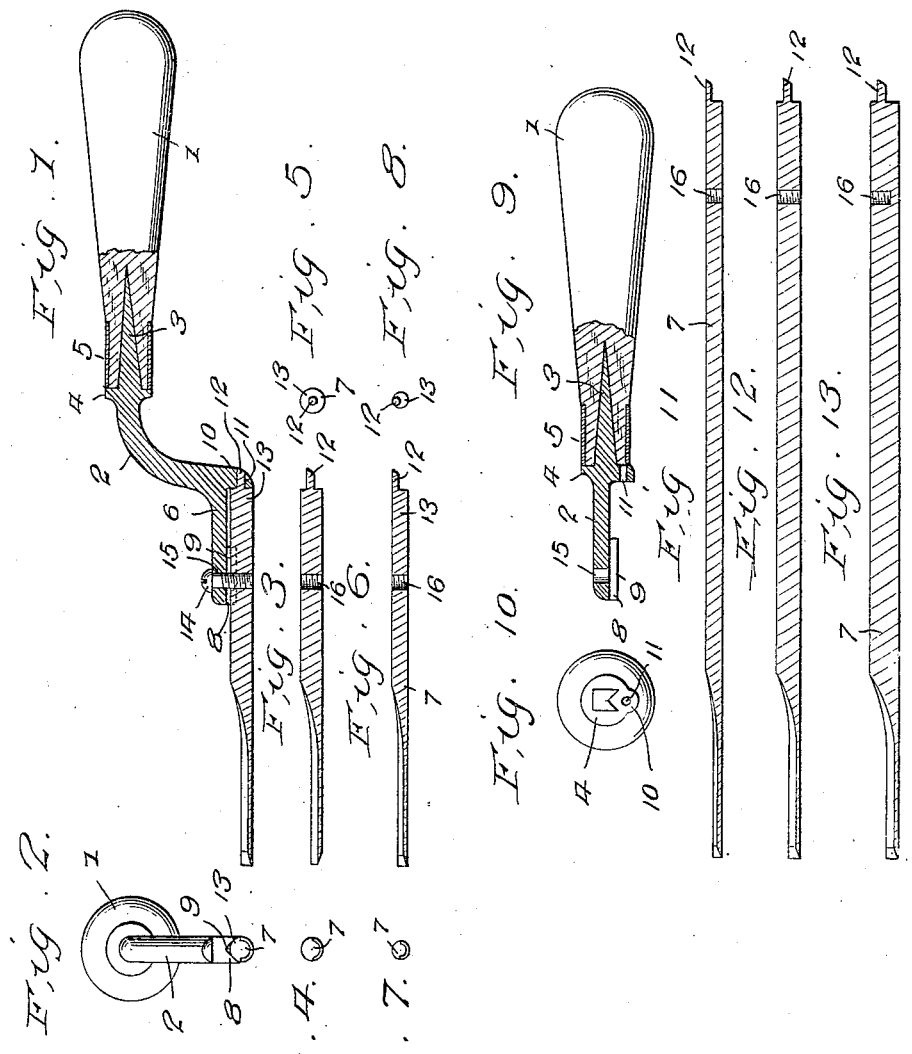
WITNESSES:
INVENTOR
E. J. Belknap
BY
W. J. FitzGerald
Attorneys

UNITED STATES PATENT OFFICE.

EDWIN J. BELKNAP, OF CHICAGO, ILLINOIS.

TOOL-HOLDING APPLIANCE.

No. 921,579.  Specification of Letters Patent.  Patented May 11, 1909.

Application filed March 17, 1908. Serial No. 421,667.

*To all whom it may concern:*

Be it known that I, EDWIN J. BELKNAP, a citizen of the United States, residing at Chicago, in the county of Cook and State of Illinois, have invented certain new and useful Improvements in Tool-Holding Appliances; and I do hereby declare the following to be a full, clear, and exact description of the invention, such as will enable others skilled in the art to which it appertains to make and use the same.

My invention relates to new and useful improvements in tool-holding appliances and more particularly to that class adapted to be used for holding cutting bits, such as chisels, gouges and the like, and my object is to provide a universal handle to receive a variety of such tools.

A further object is to provide means for removably securing the tools to the shank of the handle and a still further object is to provide means for holding the tools in axial alinement with the shank of the handle.

Other objects and advantages will be hereinafter referred to and more particularly pointed out in the claim.

In the accompanying drawings which are made a part of this application, Figure 1 is a longitudinal, sectional view through my improved appliance, showing a cutting tool secured thereto. Fig. 2 is an end elevation thereof. Fig. 3 is a longitudinal, sectional view through one of the tools removed from the handle. Figs. 4 and 5 are views of the opposite ends thereof. Fig. 6 is a longitudinal, sectional view through a different form of tool. Figs. 7 and 8 are views of opposite ends thereof. Fig. 9 is a sectional view of a handle having a straight shank. Fig. 10 is an end elevation thereof, and Figs. 11, 12 and 13 are longitudinal, sectional views of tools adapted more particularly to be secured to that form of handles shown in Figs. 9 and 10.

Referring to the drawings in which similar reference numerals designate corresponding parts throughout the several views, 1 indicates a handle, which is preferably constructed of wood, to one end of which is secured a shank 2, said shank having a prong 3 adapted to enter the reduced end of the handle, a shoulder 4 being formed at the juncture of the prong with the shank 2, which shoulder is substantially circular and adapted to rest against the end of the handle 1, said handle being surrounded by a thimble 5 to prevent the prong from splitting the handle. As shown in Figs. 1 and 2 of the drawings, the shank is curved downwardly and provided at its lower end with an arm 6, to which the bits or cutting tools 7 are to be secured, the forward end of the arm 6 being provided with wings 8, the inner faces of which are tapered to form a V-shaped recess 9, while the opposite end of the arm is provided with a depending lip 10, through which extends an opening 11, into which is adapted to be entered a pin 12, formed integral with the head 13 of the tool 7. As best shown in Figs. 5 and 8 of the drawing, the head is preferably circular in cross section and when said head is seated in the recess 9, the tapered faces of the wings 8 will engage the surface of the head and hold the tool from swinging laterally, the tool being secured to the arm 6 by introducing a locking screw 14 through an opening 15 in the arm and into a threaded opening 16 in the tool 7.

As shown in Fig. 9 of the drawings, the shank 2 extends in an axial plane with the axial plane of the handle and when so arranged, the lip 10 is formed with the shoulder 4, as best shown in Fig. 10, thus bringing the longitudinal axis of the tool substantially in alinement with the axis of the handle, the tool being secured to this form of shank in the same manner as in the form shown in Fig. 1, the shank 2 in this instance forming the arm from which depend the wings 8.

In securing the tools to the holding appliance, the pin 12 is first entered in the opening 11 and the screw 14 then introduced through the opening 15 and into the threaded opening 16, the screw when turned home, drawing the head 13 into the recess 9, the highest point of that portion of the head resting in the recess, being above the lower edge of the wings 8, so that the wings will bind on the head at each side of the vertical center thereof and prevent lateral movement of the tool.

It will thus be seen that I have provided an appliance that may be used for holding a variety of tools and one wherein the tools may be quickly secured to or removed from the holding appliance.

What I claim is:

In combination a handle, an arm carried by said handle, elongated spaced wings formed on the under surface of the arm and disposed longitudinally thereof from the free end of the arm, a lip depending from the arm and formed therewith, said lip having a longitudinally disposed opening, said arm also having an opening therethrough intermediate the wings, a tool having a cavity adapted to register with the opening of the arm intermediate the wings, said tool being insertible between the wings, a screw adapted to enter the opening in the arm and engage the cavity in the tool to hold said tool in engagement with the wings and a pin projecting from an end of the tool insertible within the opening in the lip of the arm.

In testimony whereof I have signed my name to this specification in the presence of two subscribing witnesses.

EDWIN J. BELKNAP.

Witnesses:
W. A. DIMAN, Jr.,
WM. E. ADAMS.